Patented July 4, 1939

2,164,524

UNITED STATES PATENT OFFICE 2,164,524

AZO DYE

Henry Jordan and Swanie S. Rossander, Wilmington, Del., assignors to E. I. du Pont de Nemours & Company, Wilmington, Del., a corporation of Delaware No Drawing. Application July 3, 1937, Serial No. 151,961

6 Claims. (Cl. 260—169)

A. This invention relates to direct azo dyes for cellulose, within which term is included those compounds commonly referred to as cellulose and regenerated cellulose.

B. There is a demand in the trade for developed reddish and brown shades of cellulose dyes which have exceptional fastness to washing and excellent discharge properties. In order to meet this demand, it has been necessary not only to create new dyestuffs but new intermediates. We have discovered that the dyes of the present invention are useful not only for the direct coloring of cellulose but are also useful when developed on the fiber with suitable coupling components in the production of colors of the indicated shades and with the required properties.

C. It is an object of this invention to prepare dyestuffs which are applicable as direct dyes to cellulose. There has been an increasing demand in the art for dyestuffs of direct reddish shade which are easily applied and are highly substantive to the fiber and which show high fastness properties.

D. The objects of the invention are accomplished by the manufacture and use of an intermediate being a trisazo dye having 2-amino-benzidine as an end component. The dyestuffs of this invention are made water-soluble by having a water-solubilizing group, such as sulfonic or carboxylic acid in at least one of the aryl nuclei of the dye.

E. The following examples illustrate but do not limit the invention:

Example I

Dissolve 15.1 parts of 2-naphthylamine-6:8-disulfonic acid in 100 parts of water. Cool to 10° C. Add 12.5 parts of 10 normal hydrochloric acid, followed by 25 parts of 2 normal sodium nitrite. Hold one-half hour end point with a slight excess of sodium nitrite at 10–15° C.

Dissolve 6.7 parts of meta toluidine in 50 parts of water and 6.3 parts 10 normal hydrochloric acid. Add to the above diazo. Make neutral to Congo by the addition of 20 parts of sodium acetate. Heat slowly to 40° C. Stir the coupling overnight. Add 30% sodium chloride. Stir four hours. Filter acid to litmus. Dissolve the residue in 250 parts of water and 6.3 parts 10 normal sodium hydroxide (alkaline to Brilliant Yellow paper). Adjust the temperature to 22–24° C. Add 13 parts of 10 normal hydrochloric acid and 23.5 parts of 2 normal sodium nitrite solution. Hold a definite excess of sodium nitrite for one hour. Remove any trace of excess sodium nitrite with urea.

Dissolve 6.42 parts of meta toluidine in 50 parts of water and 6 parts of 10 normal hydrochloric acid. Add to the above diazo. Make neutral to Congo by the addition of 12 parts of sodium acetate. Stir the coupling overnight. Add 20% sodium chloride. Heat to 70° C. Make acid to Congo by adding hydrochloric acid and filter. Dissolve the residue in 500 parts of water and 6 parts of 10 normal sodium hydroxide and 20 parts of 2 normal sodium carbonate. (Alkaline to Brilliant Yellow paper.) Heat to 90° C. Add 10 parts nuchar and 5 parts filter-cel. Hold at 90° C. for ten minutes and filter. Add 20% sodium chloride to the filtrate, stir one-half hour and filter.

Dissolve the residue in 500 parts of water. Cool to 25–30° C. Add 13 parts of 10 normal hydrochloric acid and 20 parts of 2 normal sodium nitrite solution. Hold a definite end point of excess sodium nitrite for one hour. Remove any trace of excess sodium nitrite with urea.

Dissolve 15.4 parts 2-amino-benzidine as the tri-hydrochloride in 50 parts of water. Add to the above diazo. Make the coupling neutral to Congo with 50 parts 2 normal sodium acetate. Stir overnight. Heat to 70° C., make acid to Congo with hydrochloric acid and filter. Paste the residue with 6 parts of dry sodium carbonate and dry. The product is a dark powder which is soluble in water. The probable formula of the dye is:

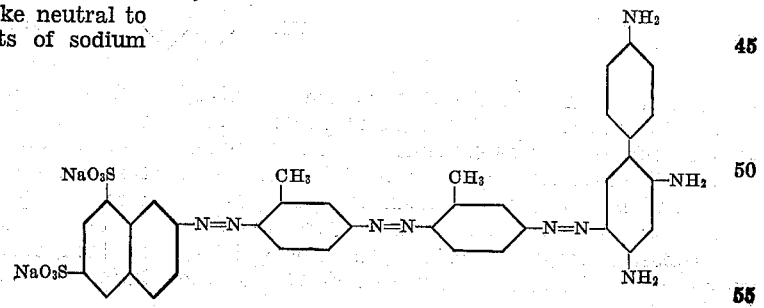

F. Following are tabulated representative products of the invention. The compositions of the products are designated by the components used. The arrows point from the diazo components and to the coupling components.

| Ex. | Composition of product | Color of dyeing |
|---|---|---|
| 2 | 2-naphthylamine-6:8-disulfonic acid→meta-toluidine→meta-toluidine→2-amino-benzidine. | Violet. |
| 3 | 2-naphthylamine-4:8-disulfonic acid→meta-toluidine→meta-toluidine→2-amino-benzidine. | Black. |

G. The aryl groups of the components may have substituents other than those specifically mentioned. These substituents are halogen, alkyl, alkoxy, carboxy, and sulfonic acid. The aryl components, other than 2-amino-benzidine, are preferably of the benzene or naphthalene series, but may be of other series, for instance, diphenyl. The end component, other than 2-amino-benzidine, may also consist of a component having a single phenyl-alkyl-pyrazolone nucleus. In making the dyes it must be observed that the middle coupling components be of such composition that the coupling product is capable of diazotization and further coupling. Meta-toluidine, alpha-naphthylamine, 1-naphthylamine-6-sulfonic acid, and 2-amino-5-naphthol-7-sulfonic acid are examples of components which are particularly suited for middle components.

H. Adequate solubility is usually assured by having two water-solubilizing groups attached to the nucleus.

I. In addition to their use as direct dyes these compounds are also useful for the production of dyes on the fiber, and for conversion to amino-aroyl derivatives which are useful in dyeing cotton and regenerated cellulose. It is to be noted that the dyes excel in substantivity to cellulose.

J. These colors have outstanding washing fastness and excellent discharge properties. They themselves vary from bright orange to violet in color on cellulose, but are remarkable for the production of direct reds to browns when developed on the fiber.

K. As many apparently widely different embodiments of this invention may be made without departing from the spirit and scope thereof, it is to be understood that we do not limit ourselves to the specific embodiments thereof except as defined in the appended claims.

We claim:

1. A water-soluble compound represented by the formula:

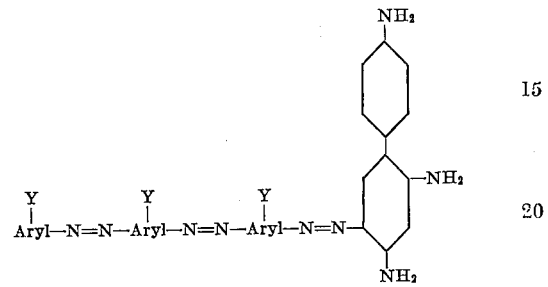

in which Y is one or more of the group consisting of hydrogen, halogen, alkyl, alkoxy, carboxy, and sulfonic acid, at least one Y being a water-solubilizing group and the end aryl has a single nucleus from the class consisting of benzene, naphthalene, diphenyl, phenyl-methyl-pyrazolone, and aryl of interior components has a single nucleus from the class consisting of benzene, naphthalene, and diphenyl.

2. A compound represented in the form of its sodium salt by the formula:

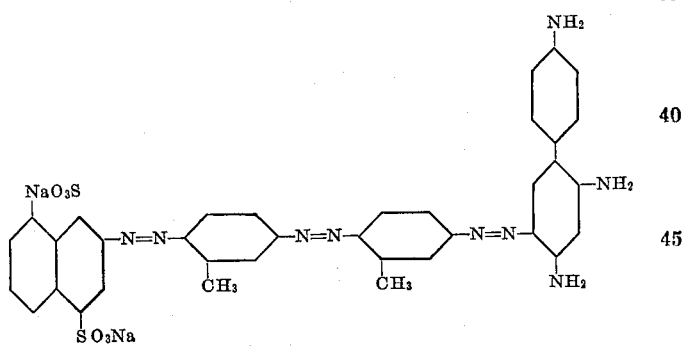

3. A compound represented in the form of its sodium salt by the formula:

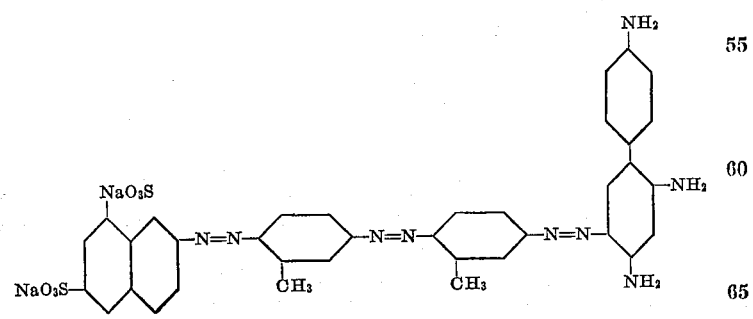

4. The process which comprises incorporating 2-naphthylamine-6:8-disulfonic acid in aqueous medium, diazotizing it, adding an acidified solution of meta toluidine making neutral to Congo red, heating and stirring, filtering acid to litmus, dissolving the residue in an alkaline aqueous medium, diazotizing, adding an aqueous acid solution of meta-toluidine, neutralizing to Congo red, stirring and heating, filtering, dissolving and purifying, diazotizing, and adding an aqueous medium containing 2-amino-benzidine-trihydrochloride, neutralizing to Congo red, heating, agitating, and isolating the product.

5. The process which comprises diazotizing 2-naphthylamine-6:8-disulfonic acid, coupling it to meta-toluidine, diazotizing the product, and coupling it to meta-toluidine, diazotizing the product and coupling it to 2-amino-benzidine.

6. The process which comprises diazotizing the compound represented by the formula

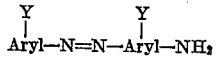

in which Y is one of a group consisting of hydrogen, halogen, alkyl, alkoxy, carboxy, and sulfonic acid, coupling it to a diazotizable primary-arylamine containing Y as defined, at least one Y being a water-solubilizing group, diazotizing the resulting compound, and coupling it to 2-amino-benzidine.

HENRY JORDAN.
SWANIE S. ROSSANDER.